United States Patent
Sourani

(10) Patent No.: US 9,006,629 B2
(45) Date of Patent: Apr. 14, 2015

(54) CONTROLLING LASER POWER

(75) Inventor: Sason Sourani, Hod Hasharon (IL)

(73) Assignee: STMicroelectronics International N.V., Amsterdam (NL)

( * ) Notice: Subject to any disclaimer, the term of this patent is extended or adjusted under 35 U.S.C. 154(b) by 392 days.

(21) Appl. No.: 13/588,137

(22) Filed: Aug. 17, 2012

(65) Prior Publication Data

US 2013/0044774 A1   Feb. 21, 2013

(30) Foreign Application Priority Data

Aug. 18, 2011 (IL) .......................................... 214741

(51) Int. Cl.
*H01S 3/10* (2006.01)
*H04N 9/31* (2006.01)

(52) U.S. Cl.
CPC ........... *H04N 9/3129* (2013.01); *H04N 9/3155* (2013.01); *H04N 9/3164* (2013.01)

(58) Field of Classification Search
CPC . H04N 9/3129; H04N 9/3155; H04N 9/3164; H04N 9/3135; H04N 9/3161; H01S 3/10; H01S 3/101; H01S 5/005; G02B 26/101; G02B 26/127
USPC ....... 250/205, 201.1, 214 AL, 214 R; 353/30, 353/31, 85, 121
See application file for complete search history.

(56) References Cited

U.S. PATENT DOCUMENTS

| | | | |
|---|---|---|---|
| 7,255,445 B2* | 8/2007 | Kojima | 353/31 |
| 7,377,656 B2* | 5/2008 | Nojima et al. | 353/77 |
| 7,756,174 B2* | 7/2010 | Benner, Jr. | 372/38.09 |
| 7,837,332 B2* | 11/2010 | Gollier | 353/30 |
| 7,967,452 B2* | 6/2011 | Itoh et al. | 353/99 |
| 7,993,005 B2* | 8/2011 | Peterson | 353/30 |
| 8,511,838 B2* | 8/2013 | Rothaar | 353/99 |
| 2005/0110954 A1 | 5/2005 | Kojima | |
| 2008/0112028 A1 | 5/2008 | Peterson | |
| 2009/0066916 A1 | 3/2009 | Brown | |
| 2009/0161705 A1* | 6/2009 | Almoric et al. | 372/24 |
| 2009/0262262 A1* | 10/2009 | Itoh et al. | 348/760 |
| 2011/0279880 A1* | 11/2011 | Benner et al. | 359/205.1 |
| 2013/0003026 A1* | 1/2013 | Rothaar | 353/85 |
| 2013/0044774 A1* | 2/2013 | Sourani | 372/29.014 |

OTHER PUBLICATIONS

EP Extended Search Report for EP12180931.3 mailed Sep. 5, 2013 (6 pages).

* cited by examiner

*Primary Examiner* — John Lee
(74) *Attorney, Agent, or Firm* — Gardere Wynne Sewell LLP

(57) ABSTRACT

An intensity of radiation emitted from at least two laser diodes of a projecting apparatus is optimized by providing an offset distance between at least two focal points of the at least two laser diodes and providing a maximum value for radiation intensity emitted by each of the laser diodes, irrespective of simultaneous transmission by one of the laser diodes with another of the laser diodes. The intensity of the radiation emitted from each of the at least two laser diodes is adjusted such that an aggregated value of the radiation intensity emitted by all of the laser diodes within a predefined period of time may exceed a threshold value allowed for the maximum permissible exposure to radiation.

19 Claims, 2 Drawing Sheets

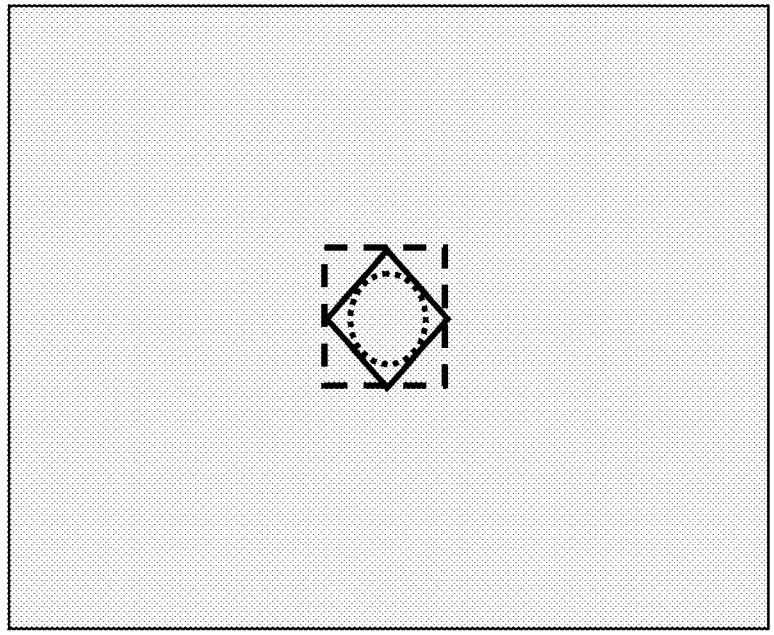
FIG. 1 – PRIOR ART
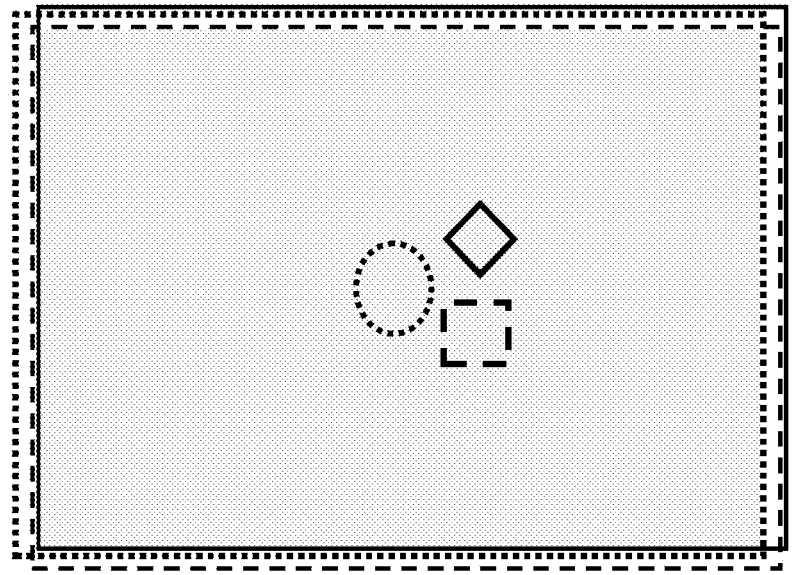
FIG. 2

CONTROLLING LASER POWER

PRIORITY CLAIM

This application claims priority from Israel Application for Patent No. 214741 filed Aug. 18, 2011, the disclosure of which is hereby incorporated by reference.

TECHNICAL FIELD

The present disclosure generally relates to laser scanning applications, and more particularly to techniques for controlling laser power in multi-laser devices.

BACKGROUND

As the use of radiated optical power of laser diodes has been increasing in recent years, the issue of eye safety has received an ever-increasing amount of attention. In the past, all laser applications were covered by the International Electrotechnical Commission (IEC) 60825 standard which is a laser safety standard (the disclosure of which is hereby incorporated by reference). Today, laser applications that deal with data transmission, projection devices and irradiation of objects, are covered by the IEC 60825 standard.

According to IEC 60825, for visual light (i.e. 400 nm≤$\lambda$<1050 nm), all pulses that reach a focal point within a period of time of 18 μs should be aggregated into a single pulse. This is due to the fact that during this period there is not enough time to allow the removal of heat accumulated at that focal point. However, for pulses that would arrive to that focal point after a period of 18 μs starting at their preceding pulse, heat transfer is a factor that may already be taken into consideration.

Typically (but not necessarily) three different lasers, each emitting at a different wavelength, are used to cover most of the color gamut of the human eye. These lasers are collimated and merged in order to produce a single beam with variable color, according to the specific combination of the three lasers intensities at that moment.

There is a need in the art to provide a method to enable increasing the intensity of a laser system while still being in conformity with the IEC Safety regulations, by taking advantage of the need to use several lasers in order to create the right color gamut.

SUMMARY

In accordance with an embodiment, apparatus and method are provided for increasing the lasers' intensities without exposing the user to a hazardous amount of energy.

In accordance with an embodiment, methods are provided to enable increasing the power of each member of a group of simultaneously emitting lasers that are comprised in a device such as a projector.

In an embodiment, a laser diode projecting apparatus is provided. The laser diode projecting apparatus comprises: at least two laser diodes each emitting radiation towards a respective focal point at a pre-defined wavelength, and wherein the at least two respective focal points are separated from each other by at least an offset distance; and a power controller operative to control the intensity of the radiation emitted from each of the at least two laser diodes; wherein the aggregated value of the radiation intensity emitted by all of the at least two laser diodes within a predefined period of time, exceeds a threshold value allowed for the maximum permissible exposure to radiation.

In other words, each respective laser diode from among the at least two laser diodes is capable of reaching a maximum value as defined for that laser diode, irrespective of the fact that it emits radiation simultaneously with at least one other laser diode.

In the following description, the term "focal point" is defined as the spot wherein radiation comprised in a beam emitted from one of the laser diodes of the projecting apparatus, hits the target (e.g. a screen).

The term "offset distance" is a parameter defined herein throughout the specification and the claims as the maximum diameter of a pupil. Typically, the value of this parameter may be up to about to 9 mm, however under certain conditions (e.g. in broad daylight), it may be less than that, e.g. 5 mm. In the alternative, the value of the offset distance may be taken as being essentially equal to the size of a retinal image (e.g. 0.2 mm).

The term "predefined period of time" is referred to herein as a parameter that defines a time period wherein if two or more pulses reach the same point within that period of time, for safety purposes the effective radiation that hits the eye in this case, is achieved by aggregating the energy of all these pulses as if they were a single pulse. The value of this parameter for visible light (i.e. 400 nm≤$\lambda$<1050 nm) is defined in the IEC 60825 as 18 μs, however other standards may provide different values for this parameter.

The term "maximum permissible exposure" as used herein, is used to denote the maximum level of radiation to which the eye or skin can be exposed without consequential injury immediately or after a long time. The maximum permissible exposure may be dependent on the wavelength of the laser radiation, the pulse duration or exposure duration, the tissue at risk and, for visible and near infra-red laser radiation in the range of 400 nm to 1400 nm, the size of the retinal image. The threshold value allowed for the maximum permissible exposure to radiation is defined by standards that are acceptable in the industry such as IEC 60825.

In another embodiment the at least two focal points are separated from each other so that when their respective diode lasers are operative, the two laser diodes will not emit radiation that would hit the same pixel within a predefined period of time.

In yet another embodiment, the offset distance between the at least two focal points is set to allow forming a projecting angle between beams projected by two of the at least two laser diodes, wherein this projecting angle is equal to at least 2 degrees. In the alternative, this value may be equal to about 4 degrees, or about 5.2 degrees. Preferably, the value of the projecting angle is less than 6 degrees.

In a related embodiment, the offset distance between the at least two focal points is set to allow forming a vertical projecting angle between beams projected by two of the at least two laser diodes, wherein this projecting angle is equal to at least 2 degrees. In the alternative, this value may be equal to about 4 degrees, or about 5.2 degrees.

According to another embodiment one of the at least two laser diodes is a red laser, and wherein the intensity of the radiation emitted within a predefined period of time is capable of reaching a maximum intensity value as defined for that laser diode, irrespective of the fact that it transmits simultaneously with at least one other laser diode.

In another embodiment, the laser diode projecting apparatus further comprises a photodetector adapted to measure the light intensity at the surrounding of the laser diode projecting apparatus, and a processor adapted to dynamically change the offset distance between the at least two focal points for the radiation emitted by the at least two laser diodes, based upon light intensity changes occurring at the surrounding of the laser diode projecting apparatus.

According to another embodiment, the pre-defined period of time is equal to at least 18 µs.

According to another aspect there is provided a method for optimizing the intensity of radiation emitted from at least two laser diodes, each emitting radiation at a pre-defined wavelength, the method comprises the steps of: providing an offset distance between at least two focal points, each of which associated with one of the at least two laser diodes; providing a maximum value for the intensity of the radiation to be emitted by each of the at least two laser diodes, irrespective of the fact that it emits its radiation simultaneously with at least one other laser diode; and adjusting the intensity of the radiation emitted from each of the at least two laser diodes, wherein the aggregated value of the radiation intensity emitted by all of the at least two laser diodes within a predefined period of time, exceeds a threshold value allowed for the maximum permissible exposure to radiation.

In other words, the method provided allows that the value of the intensity of the radiation emitted within a predefined period of time by each respective laser diode is up to the maximum value provided for that laser diode.

According to another embodiment, the step providing an offset distance comprises ensuring that the two laser diodes will not emit radiation that would hit the same pixel within a predefined period of time.

By yet another embodiment, the offset distance provided allows formation of a projecting angle between beams emitted by two of the at least two laser diodes that is equal to at least 2 degrees. In the alternative, this value may be equal to about 4 degrees, or about 5.2 degrees. Preferably, the value of the projecting angle is less than 6 degrees.

In accordance with yet another embodiment, the offset distance provided allows formation of a vertical projecting angle between beams emitted by two of the at least two laser diodes that is equal to at least 2 degrees.

According to still another embodiment, the method provided further comprises a step of measuring the light intensity at the projecting apparatus' surrounding, and dynamically adjusting the offset distance between the at least two focal points, based upon light intensity changes occurring at the projecting apparatus' surrounding.

In accordance with another embodiment, the predefined period of time is equal to at least 18 µs.

BRIEF DESCRIPTION OF THE DRAWINGS

For a more complete understanding of the present invention, reference is now made to the following detailed description taken in conjunction with the accompanying drawings wherein:

FIG. 1 illustrates the output of a scanning projector apparatus known in the art;

FIG. 2 illustrates the output of a scanning projector apparatus according to one embodiment;

DETAILED DESCRIPTION OF THE DRAWINGS

Figure 3:
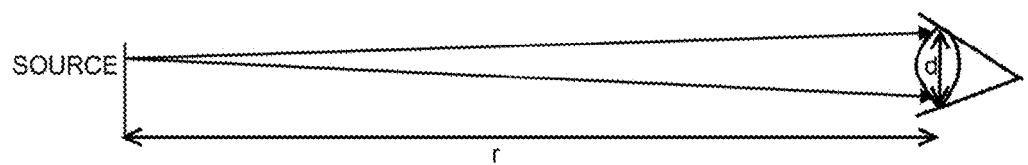
FIG. 3—illustrates the projection geometry for the minimum eye accommodation distance.

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a thorough understanding of the present invention. It should be apparent, however, that the present invention may be practiced without these specific details.

The collimation and merging of light sources require careful and accurate calibration process in order to form a single spot on a screen, at the right color. In a typical laser scanning projecting apparatus the following components are used, a single bidirectional mirror, two unidirectional mirrors or any other deflection technologies enable scanning so that with the correct refreshing time a full two-dimensional picture appears on the screen. The need to accurately calibrate the set of lasers to a single pixel at the screen may sometimes be very costly. The traditional mode of operation in which lasers are calibrated in laser scanning projectors, is, that all laser diodes of any single laser scanning projector are accurately aligned so that the radiation emitted by each of the laser diodes, hits exactly the same pixel as the radiation emitted by the others. The firmware requirement associated with such mode of operation is satisfied by carrying out only one set of calculations. The required processing involves determining the location of the spot at the target, finding the closest pixel to this location and sending the correct color information associated with this pixel to the set of laser drivers. However, in order to comply with the IEC 60825 requirements regarding the maximum value energy to which the eye's pupil may be exposed, the power of each of the lasers must be rather limited in order to ensure that the aggregated energy as emitted by all lasers does not exceed a pre-defined threshold (e.g. the maximum value).

FIG. 1 illustrates a target (screen) intersecting three beams each of which are generated by a respective one out of an RGB set of lasers comprised in a scanning projector apparatus, as known in the art. In this example the three lasers are accurately aligned so that their emitted radiation hits exactly the same pixel. The red laser is illustrated by a square shape, the green laser is illustrated by a diamond shape and the blue laser is illustrated by a circle shape. Naturally, the size of three shapes is provided for illustration purposes only and is completely out of scale as compared with their actual size. In more sophisticated systems, an interpolation with the nearby pixels may be carried out and the interpolation results may then be fed to the lasers' drivers.

According to one embodiment, the three lasers are not aligned together, i.e. the set of the three lasers is not calibrated to the same pixel of the target (although the distance that extends between the each of the laser diodes and the target is about the same). Instead, at least one of the laser diodes has an offset with respect to the calibration of the others, so that the radiation emitted by that laser diode would hit the target (screen) at a slightly different location then the others. In order to project a sharp (non-blurred) image, the firmware maintains at least two sets of calculations, one per each spot so that each laser receives the information associated with the specific location towards which it is about to emit its pulse(s). In other words, the information that is now fed to at least one of the laser driver is not associated any more with the same pixel as the information fed to all the other laser drivers, but of a different pixel that correctly matches that at least one specific laser spot at the target.

FIG. 2 demonstrates this approach in a scanning projector that also uses an RGB lasers set according to this embodiment. In this example each of the three lasers is offset with respect to the other two so that no laser diode emitted radiation hits exactly the same pixel at the same time as the others. Consequently, there are now three laser spots on the screen as may be seen in FIG. 2. The red laser spot is again represented by a square shape, the green laser spot is represented by a diamond shape and the blue laser spot is represented by a circle shape. Similarly to FIG. 1 the size of three shapes is provided only for illustration purposes. Furthermore, the effective screen area is now slightly reduced (as compared with that illustrated in FIG. 1) since it may cover only the intersection area of all three lasers effective screen areas (illustrated as a shaded grey area where the screen areas for the red, green and blue lasers overlap).

According to another embodiment, the offset between at least two of the laser spots is determined in a way to ensure that a pupil (and consequently the retina) is not exposed to a too large amount of energy, i.e. that the pupil is not exposed simultaneously to increased intensity of the radiation emitted from all lasers at the same time. By doing that it is possible to achieve an effective increase of the overall projected intensity without creating a potential hazard to the pupil.

Referring now to FIG. 3, it is illustrated that by using a simple geometry, it is possible to determine the optical offset angle required. Consider the following equation:

$$\operatorname{Tan}(\theta/2)=d/2r \quad \text{(Eq. 1)}$$

where: d is the pupil diameter; and r is the distance from the source.

As known in the art, the pupil becomes wider under dark conditions and narrower in an illuminated surrounding. At its narrow mode in the illuminated surrounding, a typical pupil diameter is 3 to 5 millimeters, whereas at wide mode in the dark surrounding the diameter of the pupil may extend to about 4 to 9 mm. Still, one should keep in mind that in any human age group, there is a considerable variation in the maximal pupil size. In the example illustrated in FIG. 3, the maximal pupil size (d=9 mm) and the minimum eye accommodation distance as defined by the IEC 60825 (r=100 nm) were selected. Thus, an angle of over $\theta=5.15°$ ($2\times a\tan((9/2)/100)$)) will ensure that at most only one laser's emitted radiation may reach the eye's pupil.

However, although the radiation emitted from the two laser diodes of FIG. 3 cannot hit the pupil simultaneously, still, this offset does not ensure that the two or more pulses emitted from these two laser diodes do not reach the pupil within a period of time of less than a 18 μs, ending up with the result that the aggregated energy that might reach the pupil, exceeds the safe level. For example, in a projector comprising two laser diodes, wherein the horizontal projection angle is $\theta_H=5.15°$ and the vertical projection angle is $\theta_V=0°$, a situation that both pulses of radiation reach the pupil within the same 18 μs time interval may occur when one of the laser diodes is scanning from left to the right, while the other laser diode, which is already at the next (the return) line, is scanning from right to the left. In order to address this constraint, let us first refer to a typical laser scanning architecture.

A typical laser scanning architecture uses a resonance mode of operation in the horizontal scan while the vertical scan is usually slower and has a saw-tooth signal (lines are scanned linearly). The typical horizontal scan is around 20 kHz-25 kHz, scanning in both directions (from left to right and from right to left), i.e. a pair of lines is scanned every horizontal cycle. Since the horizontal cycle is around 40 μs-50 μs (and as long as it is not shorter than 18 μs), a vertical projection angle offset of $\theta V=5.15°$ plus an additional angle equivalent to an angle of a pair of horizontal lines, ensures that when every two consecutive pulses are received, there is a time difference of over 18 μs therebetween. Since each frame is composed of several hundreds of horizontal lines, the additional offset may be negligible relative to the 5.15° offset.

Figure 4:
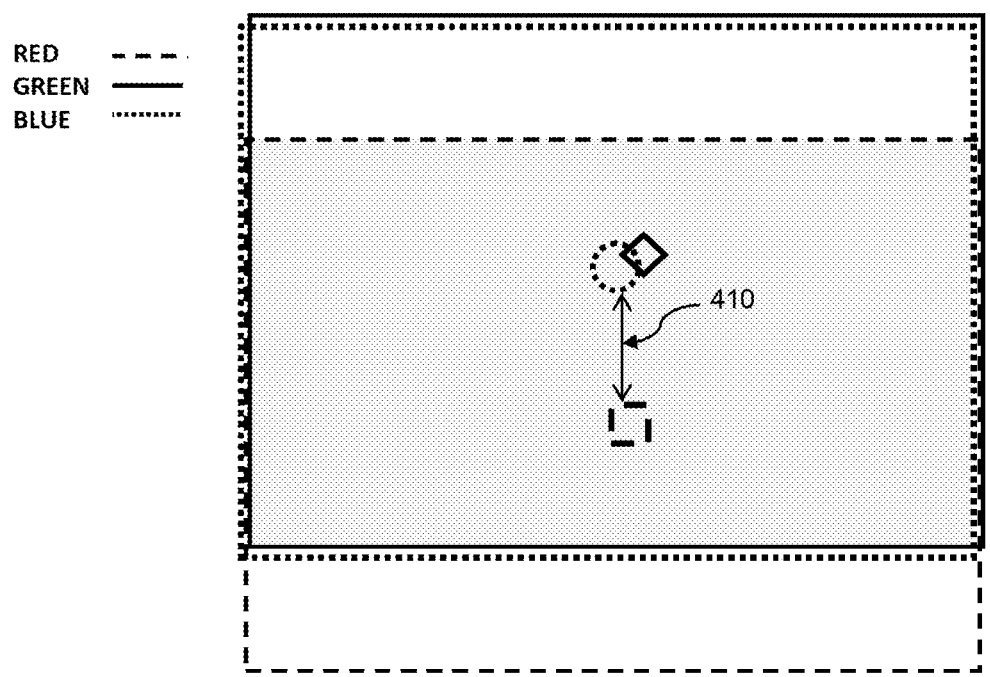
FIG. 4 illustrates the output of a scanning projector apparatus according to another embodiment.

According to another embodiment, it is not necessary to have an offset angle between each pair of laser diodes. Typically, in practical operation the maximum emitted power of the lasers is not identical to each other. For instance, in a typical RGB set of lasers, the red laser emits radiation at the highest power, more than the sum of the other two lasers (green and blue). In this case, it is possible to offset the red laser relative to the two other lasers that may have no (or very small) offset between themselves. Distance 410 in FIG. 4 illustrates such an offset between the point at which the radiation emitted from the red laser (square) hits the target and the point at which the radiation emitted from the other two laser diodes (circle and diamond) hit the target. As may be seen in this example, the radiation emitted from both green and blue laser diodes (circle and diamond) hit the target very close to each other, and may even hit the target at essentially the same focal point.

It should be understood that features described with respect to one embodiment may be used with other embodiments. Variations of embodiments described will occur to persons of the art.

What is claimed is:

1. A laser diode projecting apparatus, comprising:
    at least two laser diodes each emitting radiation towards a respective focal point at a pre-defined wavelength, and wherein the at least two respective focal points are separated from each other by at least an offset distance;
    a photodetector operative to measure light intensity near the laser diode projecting apparatus;
    a processor operative to change the offset distance between the at least two focal points based upon changes in measured light intensity occurring near the laser diode projecting apparatus; and
    a power controller operative to control an intensity of radiation emitted from each of the at least two laser diodes;
    wherein an aggregated value of radiation intensity emitted by all of the at least two laser diodes within a period of time exceeds a threshold value allowed for permissible exposure to radiation.

2. The laser diode projecting apparatus of claim 1, wherein said at least two focal points are offset from each other by a distance so that when their respective diode lasers are operative, the at least two laser diodes will not emit radiation that would hit a same pixel within said period of time.

3. The laser diode projecting apparatus of claim 2, wherein the offset distance between said at least two focal points is set so that a projecting angle formed between beams projected by two of said at least two laser diodes is equal to at least 2 degrees.

4. The laser diode projecting apparatus of claim 2, wherein the offset distance between said at least two focal points is set so that a vertical projecting angle formed between beams projected by two of said at least two laser diodes is equal to at least 2 degrees.

5. The laser diode projecting apparatus of claim 1, wherein the period of time is equal to at least 18 μs.

6. The laser diode projecting apparatus of claim 1, wherein one of the at least two laser diodes is a red laser, and wherein the intensity of the radiation emitted from said laser diode within the period of time is capable of reaching a maximum intensity value defined for that laser diode, irrespective of the fact that it transmits simultaneously with at least one other laser diode.

7. A method for optimizing the intensity of radiation emitted from at least two laser diodes of a projecting apparatus, each emitting radiation at a pre-defined wavelength, comprising:

provide an offset distance between at least two focal points, each of which is associated with one or more of the at least two laser diodes;

providing a maximum value for radiation intensity to be emitted by each of the at least two laser diodes, irrespective of the fact that it transmits its radiation simultaneously with at least one other laser diode;

measuring light intensity near the projecting apparatus;

dynamically adjusting the offset distance between the at least two focal points based upon changes in the measured light intensity occurring near the projecting apparatus; and adjusting the intensity of the radiation emitted from each of the at least two laser diodes, wherein the aggregated value of the radiation intensity emitted by all of the at least two laser diodes within a period of time exceeds a threshold value allowed for permissible exposure to radiation.

8. The method of claim 7, wherein providing comprises providing an offset distance which ensures that the two laser diodes will not emit radiation that would hit a same pixel within the period of time.

9. The method of claim 7, wherein providing the offset distance comprises forming a projecting angle between beams emitted by two of the at least two laser diodes that is equal to at least 2 degrees.

10. The method of claim 7, wherein providing the offset distance comprises forming a vertical projecting angle between beams emitted by two of the at least two laser diodes that is equal to at least 2 degrees.

11. The method of claim 7, wherein the period of time is equal to at least 18 µs.

12. The laser diode projecting apparatus of claim 1, wherein the threshold value is an amount of radiation exposure which causes injury to a human.

13. The method of claim 8, wherein the threshold value is an amount of radiation exposure which causes injury to a human.

14. A laser diode projecting apparatus, comprising:

at least two laser diodes each emitting radiation towards a respective focal point at a respective pre-defined wavelength, and wherein the at least two respective focal points are separated from each other by at least an offset distance;

a photodetector operative to measure light intensity near the laser diode projecting apparatus;

a processor operative to change the offset distance between the at least two focal points based upon changes in measured light intensity occurring at the laser diode projecting apparatus; and a power controller operative to control an intensity of radiation emitted from each of the at least two laser diodes.

15. The laser diode projecting apparatus of claim 14, wherein all of the at least two laser diodes emit an aggregated value of radiation intensity within a period of time, the aggregated value exceeding a threshold value allowed for permissible exposure to radiation.

16. The laser diode projecting apparatus of claim 15, wherein the threshold value is an amount of radiation exposure which causes injury to a human.

17. The laser diode projecting apparatus of claim 15, wherein the period of time is equal to at least 18 µs.

18. The laser diode projecting apparatus of claim 15, wherein said at least two focal points are offset from each other by a distance so that when their respective diode lasers are operative, the at least two laser diodes will not emit radiation that would hit a same pixel within the period of time.

19. The laser diode projecting apparatus of claim 18, wherein the offset distance between said at least two focal points is set so that a vertical projecting angle formed between beams projected by two of said at least two laser diodes is equal to at least 2 degrees.

* * * * *